(12) United States Patent
Junkers

(10) Patent No.: US 6,986,298 B2
(45) Date of Patent: Jan. 17, 2006

(54) METHOD OF AND POWER TOOL FOR FASTENING OBJECTS

(76) Inventor: John K. Junkers, 8 Stonewall Rd., Saddle River, NJ (US) 07458

( * ) Notice: Subject to any disclaimer, the term of this patent is extended or adjusted under 35 U.S.C. 154(b) by 47 days.

(21) Appl. No.: 10/655,182

(22) Filed: Sep. 4, 2003

(65) Prior Publication Data

US 2004/0040418 A1 Mar. 4, 2004

Related U.S. Application Data

(62) Division of application No. 10/112,101, filed on Mar. 29, 2002.

(51) Int. Cl.
*F16B 31/00* (2006.01)
*F16B 43/00* (2006.01)
*B25B 21/00* (2006.01)

(52) U.S. Cl. ................ 81/54; 81/57.38; 411/5; 411/10; 411/368; 411/433; 411/531; 411/533

(58) Field of Classification Search .......... 81/54, 81/55, 13, 57.38; 411/368, 2–5, 10, 531, 411/533, 432, 433; 29/525.02, 525
See application file for complete search history.

(56) References Cited

U.S. PATENT DOCUMENTS

| | | | |
|---|---|---|---|
| 1,678,404 A | 7/1928 | Moore et al. | |
| 1,678,409 A | 7/1928 | Ward | |
| 3,627,334 A | 12/1971 | Reddy | |
| 3,633,446 A | 1/1972 | Tadahira | |
| 3,701,372 A | 10/1972 | Breed | |

(Continued)

FOREIGN PATENT DOCUMENTS

| | | |
|---|---|---|
| DE | 24 18 598 A | 10/1975 |
| EP | 0 708 259 A | 4/1996 |
| EP | 1 058 014 | 12/2000 |
| EP | 1 080 847 A | 3/2001 |
| EP | 1 318 316 | 6/2003 |
| FR | 693 392 | 1/1930 |
| FR | 38 199 E | 4/1931 |
| FR | 2 739 650 | 4/1997 |
| GB | 1 317 319 | 5/1973 |
| GB | 1 330 320 A | 9/1973 |
| TW | 350990 | 1/1999 |
| WO | 93/09355 | 5/1993 |

OTHER PUBLICATIONS

Database WPI Week 8939, Derwent Publications Ltd, London, GB; AN 1989–283940 XP002258845 & SU 1 444 567 A, Dec. 15, 1988.

*Primary Examiner*—Debra S Meislin
(74) *Attorney, Agent, or Firm*—Michael J. Striker

(57) ABSTRACT

For assembling at least two parts of an object with one another, a bolt having a thread is introduced into the parts, a washer is placed on a free end of the bolt, a nut is threadingly connected to the free end of the bolt so as to abut against the washer, a power tool is placed so as to turn the nut by a rotatable element of the power tool connected to the nut to tighten or loosen the bolt and to apply a non-rotatable element of the power tool to the washer to absorb reaction force and the body of the washer is provided with a breaking point such that when the nut is turned and turns the bolt, the washer stops the bolt from turning and thereby the nut creates a pull on the bolt which elongates the bolt in an axial direction and applies to the body of the washer an axial force which breaks a portion of the body of the washer and allows a portion of the body of the washer to be pulled axially when the bolt elongates.

2 Claims, 2 Drawing Sheets

U.S. PATENT DOCUMENTS

| | | |
|---|---|---|
| 3,728,933 A | 4/1973 | Grube |
| 4,191,389 A | 3/1980 | Jelinek |
| 4,362,449 A | 12/1982 | Hlinsky |
| 4,572,718 A | 2/1986 | Stevens et al. |
| 4,702,657 A | 10/1987 | Jelinek |
| 4,836,727 A | 6/1989 | Volkmann |
| 4,887,948 A | 12/1989 | Calmettes |
| 4,892,000 A | 1/1990 | Renk et al. |
| 4,971,493 A | 11/1990 | Herbst et al. |
| 4,983,084 A | 1/1991 | Gray |
| 5,090,854 A | 2/1992 | Hafei |
| 5,137,408 A | 8/1992 | Junkers |
| 5,341,560 A | 8/1994 | Junkers |
| 5,533,852 A | 7/1996 | Matthews |
| 5,538,379 A | 7/1996 | Junkers |
| 5,539,970 A | 7/1996 | Junkers |
| 5,640,749 A | 6/1997 | Junkers |
| 5,779,413 A | 7/1998 | Cosenza |
| 5,803,436 A | 9/1998 | Hohmann et al. |
| 5,865,581 A | 2/1999 | Sadri et al. |
| 5,946,789 A | 9/1999 | Junkers |
| 6,135,687 A | 10/2000 | Leek et al. |
| 6,254,323 B1 | 7/2001 | Junkers |
| 6,585,467 B2 | 7/2003 | Junkers |
| 6,883,401 B2 | 4/2005 | Junkers |
| 2001/0039858 A1 | 11/2001 | Junkers |
| 2003/0031526 A1 | 2/2003 | Grant |
| 2003/0108404 A1 | 6/2003 | Junkers |
| 2003/0183045 A1 | 10/2003 | Junkers |
| 2003/0198533 A1 | 10/2003 | Junkers |

METHOD OF AND POWER TOOL FOR FASTENING OBJECTS

This is a divisional application of U.S. patent application Ser. No. 10/112,101 filed Mar. 29, 2002, pending.

BACKGROUND OF THE INVENTION

The present invention relates to a washer, a fastener provided with a washer, and a method of and a power tool for fastening objects.

It is known to fasten objects with one another with power tools which use fasteners having a multi-part replacement nut, for example including an inner sleeve, an outer sleeve, and a washer. Such a replacement nut is disclosed for example in our U.S. Pat. No. 5,341,560. Another replacement nut is disclosed in our U.S. Pat. No. 6,254,323 in which a bolt has a spline underneath its upper thread, to which a washer is non-rotatably connected, and the bolt also has engaging means for applying a reaction force, while an active force of the same tool turns the nut on the bolt thread and the washer face. In the fastener disclosed in both above mentioned patents, the common features are the use of the action and reaction force of one tool, the elimination of reaction arms on power tools, the conversion of torque to torsion-free bolt stretching and obtaining for the first time the desired residual bolt load rather than a torque, which is estimated based on calculated frictions rather than on actual frictions or a tension, which is based on estimated bolt relaxation when the force is transmitted from the elongated bolt to the hand-tight nut.

One solution is disclosed in my patent application Ser. No. 10/010,377. In this patent application a washer is proposed which has a first bearing face surface located at one axial side and cooperating with a nut, a second bearing surface located at an opposite axial side and cooperating with an object, and at least one third turning resistant surface cooperating with a thread of the bolt so that when the nut is turned with a given force in one direction and a body of the washer receives a given force in an opposite direction, only the nut turns to tighten or loosen the bolt and the body of the washer remains rotation stationary, while the bolt elongates or relaxes in an axial direction. However, it can be made more manufacturing friendly to reduce its manufacturing cost.

SUMMARY OF THE INVENTION

Accordingly, it is an object of the present invention to provide a washer, fastener provided with a washer, method of power tool for fastening with the use of the washer, which provides a further solution to the above specified problems.

In keeping with these objects and with others which will become apparent hereinafter, one feature of the present invention resides, briefly stated, in a washer which has a body having an axis and provided with a first bearing face surface located at one axial side and adapted to cooperate with a nut, a second bearing face surface located at an opposite axial side and adapted to cooperate with an object, at least one third turning resistant surface adapted to cooperate with a thread of the bolt, wherein said body has at least one breaking point arranged so that when the nut is turned and turns the bolt said body of the washer stops the bolt from turning and thereby the nut creates a pull on the bolt which elongates the bolt in an axial direction and applies to said body of the washer an axial force which breaks a portion of said body of said body of the washer and allows said portion of said body of the washer to be pulled axially when the bolt elongates.

Another feature of the present invention resides in a threaded fastener for connecting two parts which constitute an object, which fastener has a bolt having a thread, a nut screwable on the bolt, and a washer to be applied between the nut and the object and including a body having an axis and provided and provided with a first bearing face surface located at one axial side and adapted to cooperate with a nut, a second bearing face surface located at an opposite axial side and adapted to cooperate with an object, at least one third turning resistant surface adapted to cooperate with a thread of the bolt, wherein the body has at least one breaking point arranged so that when the nut is turned and turns the bolt said body of the washer stops the bolt from turning and thereby the nut creates a pull on the bolt which elongates the bolt in an axial direction and applies to said body of the washer an axial force which breaks a portion of said body of the washer and allows said portion of said body of the washer to be pulled axially when the bolt elongates.

Still another feature of the present invention resides in a method of assembly at least two parts of an object with one another, comprising the steps of introducing a bolt having a thread into the parts so that a free end of the bolt extends outwardly beyond at least one side of the parts; placing a washer on said free end of said bolt; threadably connecting a nut to said free end of said bolt so as to abut against the washer; placing a power tool so as to turn the nut with a turning portion of the power tool connected to the nut to tighten or loosen the bolt and applying a reaction portion of the power tool to the washer to absorb a reaction force; and providing the body of the washer with a breaking point arranged so that when the nut is turned and turns the bolt said body of the washer stops the bolt from turning and thereby the nut creates a pull on the bolt which elongates the bolt in an axial direction and applies to said body of the washer an axial force which breaks a portion of said body of the washer and allows said portion of said body of the washer to be pulled axially when the bolt elongates.

In accordance with still a further feature of the present invention, a power tool for fastening parts forming an object is proposed which has a housing provided with a non-rotatable element; a power drive in said housing driving a rotatable driving element; a fastener part including a bolt having a thread and an axis and introducible into the parts forming an object, a nut screwable on said bolt and cooperating with said driving element, and a washer to be applied between said nut and the object and cooperating with said non-rotatable element, said washer having an axis and being provided with a first bearing face surface located at one axial side and adapted to cooperate with said nut, a second bearing face surface located at an opposite axial side and adapted to cooperate with the object, and at least one turning resistant surface adapted to cooperate with said thread of said bolt, so that when said nut is turned by said driving element and turns said bolt, said body of said washer stops said bolt from turning and thereby said nut creates a pull on said bolt which elongates said bolt in an axial direction and applies to said body of said washer an axial force which breaks a portion of said body of said washer and allows said portion of said body of said washer to be pulled axially when said bolt elongates.

In accordance with one embodiment of the present invention, the washer body can be composed prevents initially an axial displacement of the other part which is engaged with the bolt, and thereafter one of said parts is broken under the action of the axial force applied in response to the elongation of the bolt.

In accordance with another feature of the present invention, the washer body can be formed as a one-piece integral element, which subsequently is broken at the breaking point when the axial force is applied by the elongating bolt to the washer.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
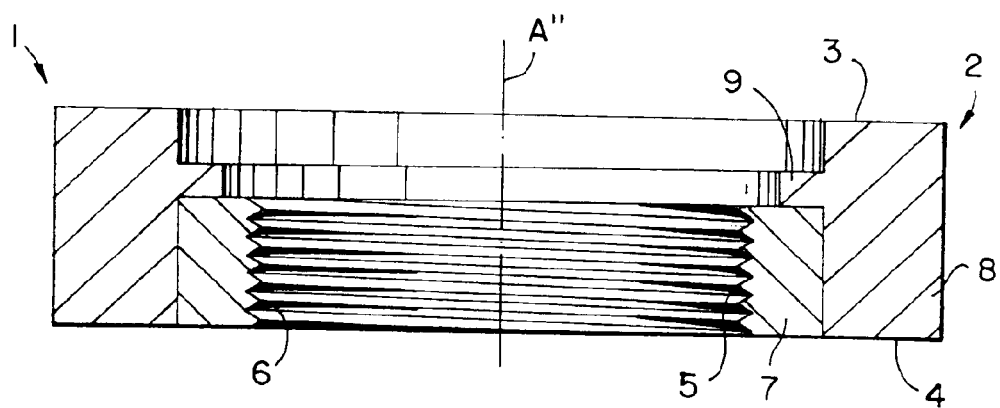
FIG. 1 is a view showing a washer in accordance with the present invention.

FIG. 1 shows a washer in accordance with the present invention which is identified with reference numeral 1 as a whole. The washer 1 has a body which is identified with reference numeral 2. The body 2 of the washer 1 has a first upper bearing face surface 3 adapted to cooperate with a nut, a second lower bearing face surface 4 adapted to cooperate with an object which can be formed as two parts to be assembled with one another, and at least one turning resistant surface identified with reference numeral 5.

The first and second bearing face surfaces 3 and 4 are spaced from one another in an axial direction or in other words in a direction of an axis A1. The at least one third turning resistant surface 5 is located radially inwardly of the body 2 of the washer 1. The third turning resistant surface 5 is formed so as to engage with or wedge in a thread of the bolt, for example by providing a corresponding thread 6 on the turning resistant surface 5.

As can be seen from FIG. 1, the body 2 of the washer 1 is composed of two parts 7 and 8 located substantially radially adjacent to one another, so that the part 7 is located radially inwardly of the part 8. The turning resistant surface 5 with the thread 6 is provided radially inwardly on the part 7. The part 8 has a projection 9 which is located above the part 7 and prevents axial upward displacement of the part 7. However, the projection 9 is designed so that it can break under the action of a certain force acting in an axial upward direction. The part 7 can be pree fit, knurled, splined or otherwise turning resistant connected with the part 8.

Figure 2:
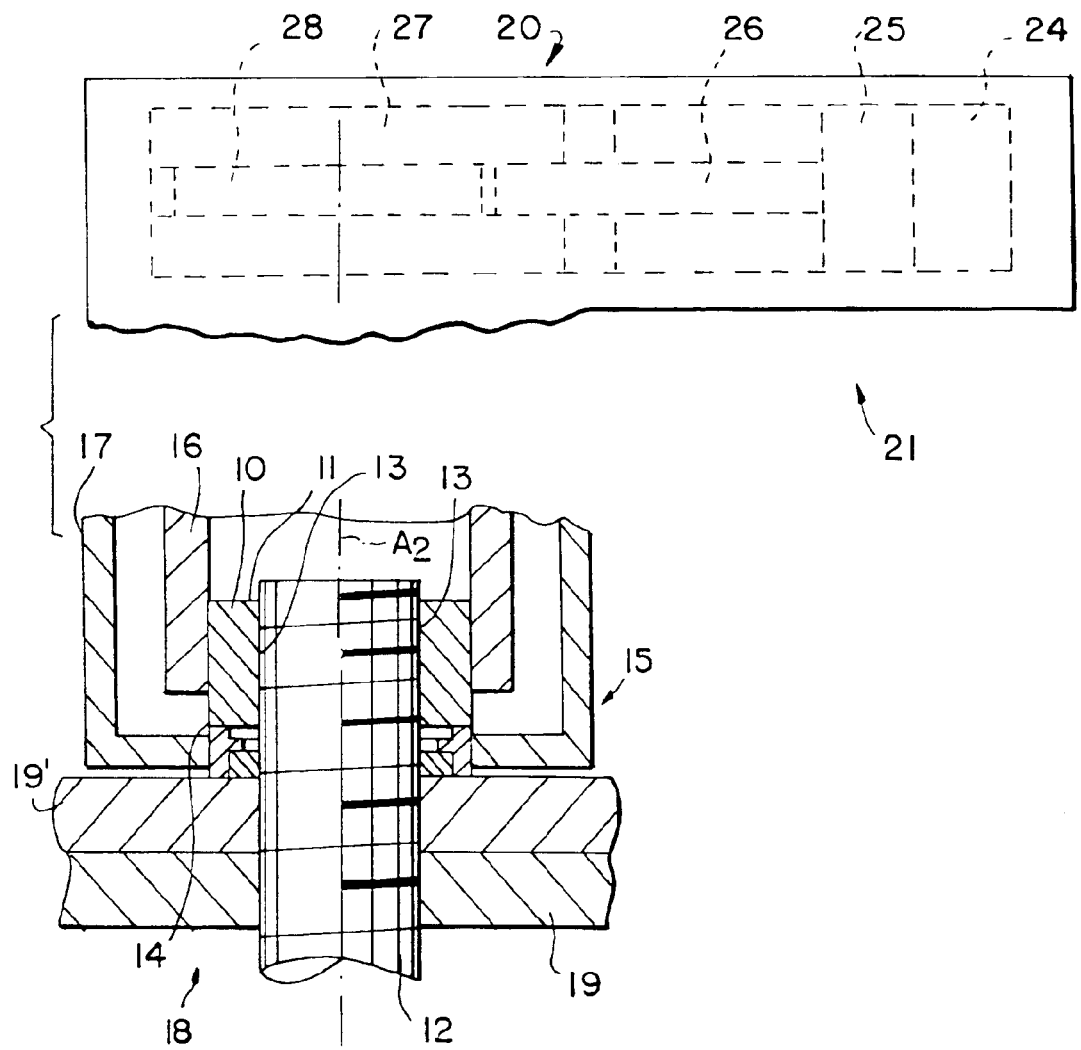
FIG. 2 is a view showing a fastener with a washer and a tool applied to the fastener, and illustrating a fastening method in accordance with the present invention.

FIG. 2 shows a fastener provided with the washer, and with a tool applied to the fastener. The fastener has a nut 10 having an inner thread 11. The fastener further has a bolt 12 provided with an outer thread 13, and having an axis A2. The nut 10 has a lower bearing face surface 14 which is adapted to be placed on the upper bearing face surface 3 of the body 2 of the washer 1. The outer thread 13 of the bolt 12 engages with the inner thread 11 of the nut 10, and also engages with an inner thread 6 of the body 2 of the washer 1.

A power tool in accordance with the present invention is shown in FIG. 2 and identified with reference numeral 15. The power tool has a housing which is identified with reference numeral 20 and a power drive which is identified with reference numeral 21. The power drive is formed for example as a cylinder-piston unit which includes a cylinder 24 and a piston 25 which is movable in the cylinder and provided with a piston rod 26. The reciprocating movement of the piston rod 26 with the piston 25 is converted into a rotary movement of a ratchet 28 through at least one drive plate 27 provided with a not shown pawl engageable with teeth of the ratchet 28. A driving element 16 is connected with the turnable ratchet 28 on the one hand and engages the nut 10 on the other hand. In order to provide such an engagement the inner surface of the driving element 16 can be provided with connecting means, for example formed as a polygonal inner surface, etc. A non-rotatable element 17 is connected to the immovable housing 20 to absorb a reaction created during turning of the driving element. The non-rotatable element 17 engages the body 2 of the washer 1 to prevent its rotation about the axes A1 and A2 which coincide with one another when the fastener is assembled. In order to engage the washer, the non-rotatable element 17 is provided with connecting means formed for example as a polygonal inner surface, etc.

The fastener with the washer is provided for fastening an object which is identified with reference numeral 18, in particular, to assemble parts 19 and 19' of the object 18 with one another.

When as shown in FIG. 2, the power tool 15 is placed on the fastener so as to tighten or loosen the nut, the turning element 16 which is connected to the nut 10 turns the nut to overcome a thread friction with the bolt 12 and the facial friction with the washer 1 so as to turn the nut, and the non-rotatable element 17 holds the washer 1 to absorb the reaction force due to the facial friction of the washer 1 with the nut 10, its facial friction with one side of the part 19', and its turning friction with the bolt 12, so that the washer 1 does not turn but absorbs the reaction force of the power tool. Initially, when the nut 10 rotates, the bolt 12 rotates together with the nut; however, the stationary washer 1 wedges the stationary part 7 into the bolt thread 13, so that the bolt stops turning because of the interengagement of its outer thread 13 with the thread 6 of the washer 1. Therefore, the bolt 12 is stopped, and an axial force is applied to the washer 1, in particular to its part 7 in an axial upward direction when the bolt 12 is elongated by the turning nut 10. Under the action of this axial upward force, the projection 9 of the part 8 of the washer 1 breaks off and the part 8 of the washer 1 is pulled upwardly.

Figure 3:
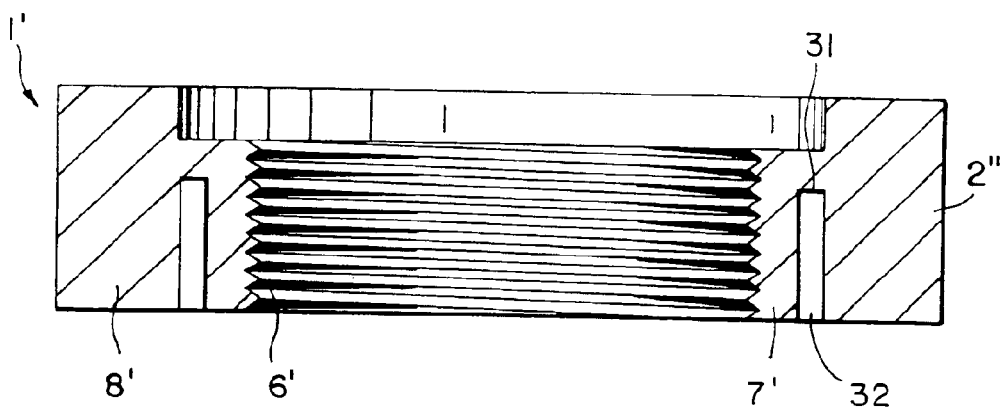
FIG. 3 is a view showing a further embodiment of the washer in accordance with the present invention.

FIG. 3 shows another embodiment of the washer in accordance with the present invention. Here the washer which is identified with reference numeral 1' has a body 2' which is formed as a one piece integral element with a partition 31 and a groove 32 provided to reduce a thickness of the partition and to make it breakable.

The operation of the washer 1' in accordance with the second embodiment of the present invention is similar to the operation of the washer 1 of the embodiment shown in FIG. 1. When the nut 10 is turned by the driving element 16 of the power tool, the bolt 12 has a tendency to turn together with the nut. As the washer 1 is held stationary and consequently the inner part 7, the bolt becomes stationary due to the interengagement of its outer thread 13 with the inner thread 6' of the body 2' of the washer 1, but is elongated in the axial direction. An axial force which is generated during the elongation of the bolt 12 is applied axially upwardly to the radially inner part upwardly 7' of the washer 1', trying to displace the inner part 7', so that eventually it breaks the partition 31 and displaces the inner part 7' of the washer 1' axially upwardly relative to the outer part 8'.

It will be understood that each of the elements described above, or two or more together, may also find a useful application in other types of constructions differing from the types described above.

While the invention has been illustrated and described as embodied in washer, fastener provided with a washer, method of power tool for fastening with the use of the washer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of assembly of at least two parts of an object with one another, comprising the steps of introducing a bolt having a thread into the parts so that a free end of the bolt extends outwardly beyond at least one side of the parts; placing on the free end of the bolt a washer having a body and being provided with a first bearing face surface located at one axial side and adapted to cooperate with a nut, a second bearing face surface located at an opposite axial side and adapted to cooperate with the object, and at least one turning resistant surface adapted to cooperate with the thread of the bolt; threadingly connecting the nut to the free end of the bolt so as to abut against the washer; placing a power tool so as to turn the nut with a rotatable element of the power tool connected to the nut to tighten or loosen the bolt and applying a non-rotatable element of the power tool to the washer to absorb a reaction force; and providing the body of the washer with a breaking point arranged so that when the nut is turned and turns the bolt said body of the washer stops the bolt from turning by the turning resistant surface and thereby the nut creates a pull on the bolt which elongates the bolt in an axial direction and applies to said body of the washer an axial force which breaks at said breaking point a portion of said body of the washer and allows said portion of said body of the washer to be pulled axially when the bolt elongates.

2. A power tool for fastening an object, comprising a tool part with a housing provided with a non-rotatable element; and a power drive located in said housing and driving a rotatable driving element; and a fastener part including a bolt having a thread and an axis and introducible into parts forming the object, a nut screwable on said bolt and cooperating with said driving element, and a washer to be applied between said nut and the object and cooperating with said non-rotatable element of said housing, said washer having a body with an axis and being provided with a first bearing face surface located at one axial side and adapted to cooperate with said nut, a second bearing face surface located at an opposite axial side and adapted to cooperate with the object, and at least one turning resistant surface adapted to cooperate with said thread of said bolt, so that when said nut is turned by said driving element and turns said bolt, said body of said washer is held by said non-rotatable element and stops said bolt from turning by the turning resistant surface and thereby said nut creates a pull on said bolt which elongates said bolt in an axial direction and applies to said body of said washer an axial force which breaks a portion of said body of said washer and allows said portion of said body of said washer to be pulled axially when said bolt elongates.

* * * * *